(12) United States Patent
Pritchard

(10) Patent No.: US 9,957,993 B2
(45) Date of Patent: May 1, 2018

(54) RECESSED HEAD FASTENER AND DRIVER COMBINATION

(71) Applicant: Research Engineering & Manufacturing INC, Middletown, RI (US)

(72) Inventor: Alan Pritchard, Cornwall (GB)

(73) Assignee: Research Engineering & Manufacturing INC, Middletown, RI (US)

( * ) Notice: Subject to any disclaimer, the term of this patent is extended or adjusted under 35 U.S.C. 154(b) by 0 days. days.

(21) Appl. No.: 14/966,179

(22) Filed: Dec. 11, 2015

(65) Prior Publication Data

US 2016/0230799 A1 Aug. 11, 2016

Related U.S. Application Data

(60) Provisional application No. 62/093,236, filed on Dec. 17, 2014.

(51) Int. Cl.
*F16B 35/06* (2006.01)
*F16B 23/00* (2006.01)
*B25B 15/00* (2006.01)

(52) U.S. Cl.
CPC ........ *F16B 23/0023* (2013.01); *B25B 15/005* (2013.01); *F16B 23/003* (2013.01)

(58) Field of Classification Search
CPC .............. F16B 23/0007; F16B 23/0023; F16B 23/0038; F16B 23/0053; F16B 23/003; F16B 35/06; B25B 15/005
USPC .......................................... 411/402, 403, 408
See application file for complete search history.

(56) References Cited

U.S. PATENT DOCUMENTS

| | | | | |
|---|---|---|---|---|
| 2,084,079 A | * | 6/1937 | Clark | F16B 23/0023 411/403 |
| 4,151,621 A | * | 5/1979 | Simmons | B21K 1/463 411/407 |
| 5,019,080 A | * | 5/1991 | Hemer | A61B 17/8615 411/402 |
| 5,207,132 A | | 5/1993 | Goss et al. | |
| 5,364,212 A | * | 11/1994 | Gill | B25B 15/005 411/404 |
| 5,509,334 A | * | 4/1996 | Shinjo | F16B 23/00 81/436 |
| 5,641,258 A | * | 6/1997 | Sala | F16B 23/003 411/402 |
| 6,341,546 B1 | * | 1/2002 | Totsu | B25B 15/005 411/404 |

(Continued)

FOREIGN PATENT DOCUMENTS

WO WO-2014/195410 A1 12/2014

OTHER PUBLICATIONS

"Notification of Transmittal of the International Search Report and the Written Opinion of the International Searching Authority, or the Declaration," International Filing Date: Dec. 11, 2015, International Application No. PCT/US2015/065198, Applicant: Research Engineering & Manufacturing Inc., dated Mar. 3, 2016, pp. 1-11.

*Primary Examiner* — Roberta Delisle
(74) *Attorney, Agent, or Firm* — Cesari and McKenna, LLP

(57) ABSTRACT

A screw recess and driver combination that comprises the use of varying frustums of differing cones to provide driver/recess contact faces that are elliptical.

12 Claims, 8 Drawing Sheets

(56) References Cited

U.S. PATENT DOCUMENTS

| | | | | |
|---|---|---|---|---|
| 6,453,781 B1 * | 9/2002 | Casino Lorite | ....... | B25B 15/005 411/404 |
| 6,886,433 B2 * | 5/2005 | Totsu | ....... | B21K 1/46 411/404 |
| 6,890,139 B2 * | 5/2005 | Hughes | ....... | B25B 15/005 411/403 |
| 6,951,158 B1 * | 10/2005 | Edland | ....... | B25B 15/005 411/404 |
| 7,077,038 B2 * | 7/2006 | Toyooka | ....... | F16B 23/0023 81/436 |
| 7,111,531 B1 * | 9/2006 | Suzuki | ....... | F16B 23/0007 81/441 |
| 7,632,053 B2 * | 12/2009 | Matzler | ....... | C21D 7/02 148/336 |
| 8,261,641 B2 * | 9/2012 | Nojikawa | ....... | B25B 15/005 81/125 |
| 2003/0059276 A1 | 3/2003 | Chen | | |
| 2005/0129486 A1 * | 6/2005 | Totsu | ....... | B25B 13/485 411/402 |

* cited by examiner (SECTION O - A REF. FIG. 5)

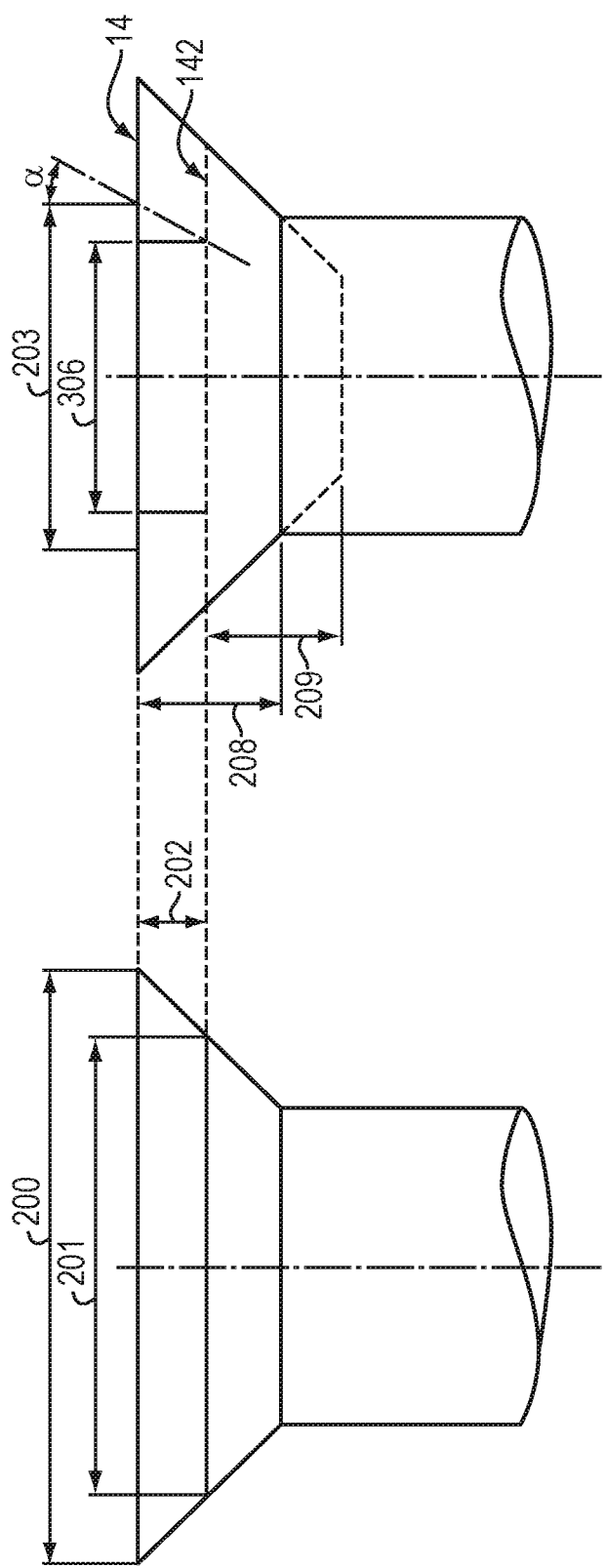

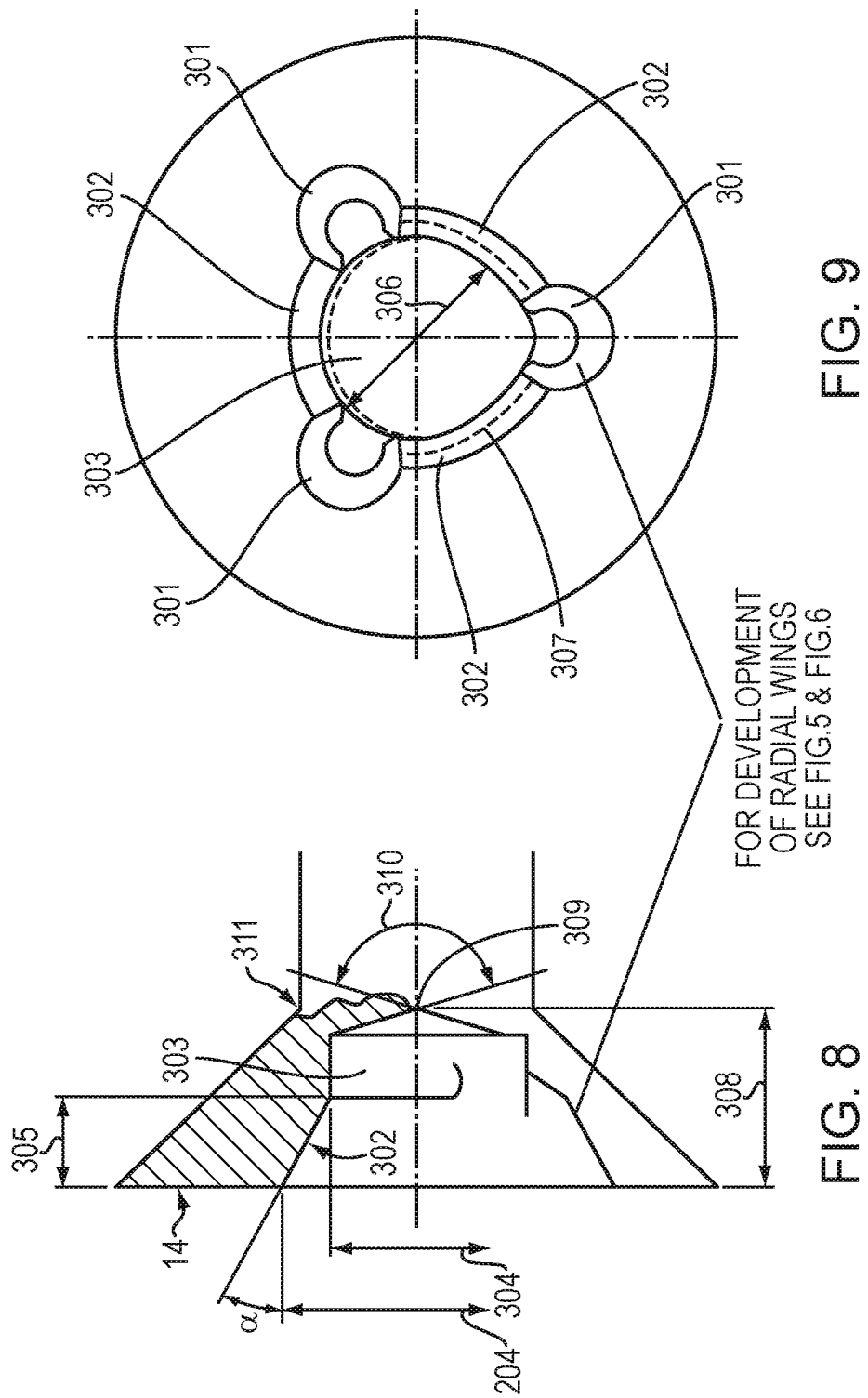

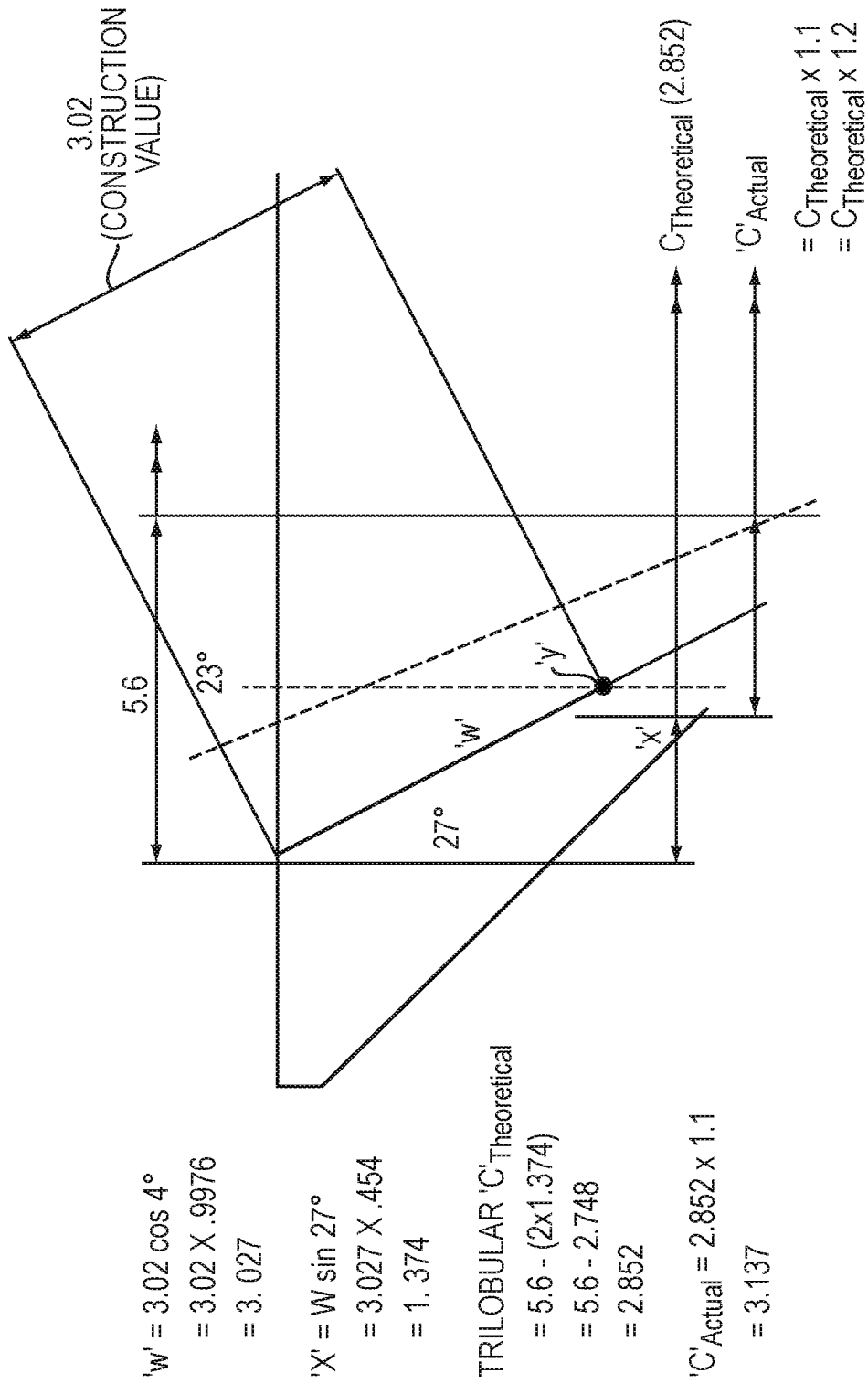

RECESSED HEAD FASTENER AND DRIVER COMBINATION

RELATED APPLICATIONS

This application claims the benefit of U.S. Provisional Application No. 62/093,236, filed on Dec. 17, 2014, the contents of which are hereby incorporated by reference herein.

BACKGROUND OF THE INVENTION

The prior art recognizes the benefits of having cruciform style recess drive systems. Exemplary issued patents that describe various alternatives include:

U.S. Pat. No. 2,046,839, entitled SCREW by Phillips, et al (relating to the well known Phillips head screws)

U.S. Pat. No. 2,592,462, entitled RECESSED HEAD FASTENER by Phippard**

U.K. Patent No. 1,006,509, entitled IMPROVEMENTS IN OR RELATING TO SCREW THREADED FASTENERS AND DRIVERS FOR USE THEREWITH, by GKN Screws and Fasteners, Ltd. (the so called POZIDRIV recess) **

U.K. Patent No. 1,521,141, entitled THREADED FASTENER by GKN Fasteners Ltd. (the so called SUPARIV recess)

U.S. Pat. No. 4,464,957, entitled FASTENER AND DRIVER COMBINATION, by Gill**

Each of these listed patents, in its own way provides an understanding of the need to minimize the adverse effect of driver/recess separation when screws are being driven to affect an assembly. As will be appreciated by those skilled in the art, this phenomena is known by the term 'cam-out'.

There is further given recognition that the cruciform systems and in association, a 3-wing system, where there are provided radial grooves as a means for driving the screw, have a need to provide for variations between the outer cone angle of the driver and the cone angle of the recess wings and that the driver cone angle 6 needs to be greater than the recess cone angle 5 and to encourage driver contact to occur at the top, outer face/edge, of the driving system 7 as seen in prior art FIG. 1. This is said to provide the best allowable contact for driving the screw and will aid toward minimizing cam-out and further reduce the effect of damage that might occur to the recess from a phenomena known as 'spinning'. The cruciform drive systems further recognize the need for clearances between the recess wings and the driver wings for engagement between driver and recess to take place as shown in prior art FIG. 2. These clearances indicate that when driving torque is applied, clearances 104 will allow relative movement, between driver and recess, such that forces will only be applied through points 105.

In addition, the patents marked with an asterisk () recognize the need for a form of mechanical adhesion, between the recess and the driver such that placement of the screw, to an assembly, is made easier. This being achieved by a 'wedging' action when the driver and recess are initially engaged as illustrated in prior art FIG. 3. This wedging action is considered to take place at the bottom of the recess 107** and is also said to be an aid toward resisting cam-out.

In accordance with Gill, UK Patent No. 1,521,141, the clearances between recess and driver wings, are used to effect by allowing the axis of the driver and the axis of the recess to be misaligned such that one of the wings has the driver cone angle approaching closer to being parallel with the screw axis and further enhances the system in respect of minimizing cam-out.

SUMMARY OF THE INVENTION

The present invention recognizes the attributes that are suggested by the prior-art of the referenced patents yet provides an inventive technique by which a screw can be driven, with effect, by a combination of screw recesses and drivers that have substantially matching configurations of both the driver and the recess. The inventive nature of providing the advances in driver/recess combination will be considered using a 3 (three)-wing system. However, the methodology used, by having 3 (three) wings radiating from a central core are applicable to systems that have 2 (two) radiating wings or 4 (four) radiating wings. If either of these variations are considered, it is recognized that a 2 (two) wing system will require an oval central core and a 4 (four) wing system will require a 4 (four) lobed central core. The extremities of the wings and a frustum of the cone that is used as an assist to stabilizing the screw and driver will be contained within the proportions as are shown and will be discussed below with reference to FIGS. 5, 6, 7 and 9.

An illustrative embodiment of the invention relates to a fastener, hereinto defined as a screw, having a recess in the head of the screw and a driver that engages said recess in a way that allows for rotation to be applied to the screw for the purpose of driving the screw to affect an assembly. As used herein, an assembly is that of joining together two or more component parts. The driver, in accordance with an illustrative embodiment of the invention, is that having an external form which substantially matches the inventive form of the internal recess in the head of the screw.

The inventive nature of the form of the recess and driver allows for one driver to be used in a multitude of recess depths that are accommodating of a variety of head styles and screw sizes. It is recognized that the variety of head styles and screw sizes is not limitless in respect of being driven by one size of driver and that there will be a need for a limited number of drivers, of variable sizes developed to satisfy the need to drive all sizes of screws and all head styles.

According to the present invention, there is provided a screw 10 that contains a threaded portion 11 and a head 12 incorporating a driving recess 13. (FIG. 4). There is a driver of matching configuration that engages the recess for the purpose of providing the rotational movement and torque needed to assemble the screw in a conventional way. (FIG. 4a). The recess and driver comprise a like number of radial grooves that extend from a central cavity, of the screw, and the central core, of the driver, respectively. The grooves are spaced equally 199 at 120° (degrees). (FIG. 5).

At the top surface of the screw head 14, there is a circumscribing circle 203 that covers the extremity of the recess cavity wings 301 (FIG. 9). Each cavity wing is developed by the use of a cone 198 that is cut at an angle α. The resulting frustum of the cone is then reproduced in the head of the screw where it is inserted at an angle 9043 for a depth 207. (FIG. 6). The cone angle Φ selected, for the construction of the wings, is preferably 8° (degree).

By using this configuration, each of the cavity wings will be seen as being elliptical 196 (FIG. 5) and the size of each ellipse will get smaller as the depth of the recess increases. As stand-alone features, it is recognized that to produce this wing configuration by conventional heading processes and to insert a driver, of matching configuration, into a recess of the thus far stated form, is not possible.

The addition of an innovative recess core dispels both of the above stated concerns and adds further to the effective nature of α (FIG. 5). The development of the angle α is analyzed and provided below in relation to FIG. 7a.

The height of the central frustum of the cone 302 will again, be discussed in detail below. It is sufficient, at this stage, to present the innovation as being that which, by the use of the entry diameter 204, the angle of the cone a and the height of the central frustum of the cone 305, will determine the physical dimension relating to the inscribing circle 306 of the central, lobular, cavity of the recess. The circumscribing circle 307, for this lobular cavity, is considered to be between limits that will not deflect from the strength of the screw and head when subjected to a twisting moment, i.e., torque.

The relative angular position of the lobes, when related to the center of the wings, is that of having the lobes, of circumscribing diameter 307, in line with the imaginary radial center of each of the wings.

BRIEF DESCRIPTION OF THE DRAWINGS

An illustrative embodiment of the invention will now be described by way of example and with reference to the accompanying drawings, in which like reference numerals indicate identical or substantially identical features:

FIG. 4a is an outline drawing of the driver having mating configuration to the recess;

FIGS. 7 and 7a depicts the development of the recess outer cone angle;

FIG. 8 is a cross sectional drawing, of the recess, highlighting the central frustum of a cone and the lobular inner core;

FIG. 9 is a plan view, of the head of the screw, showing the combination of the elliptical radial wings, the tapered, conical central upper end of the recess and the lobular central inner core of the recess;

FIG. 12 illustrates calculation of $C_{Theoretical}$ for a TRI-LOBULAR® format fastener.

DETAILED DESCRIPTION ILLUSTRATIVE EMBODIMENTS

For the purpose of describing the combination of features that make up an illustrative embodiment of the present invention, there is selected a system that would be appropriate for a restricted number of screw sizes. There is further limited, for descriptive purposes only, in that a head style that is generally known and associated with ' a metric flat head screw' is used. Other screw sizes and head styles are not excluded from the innovative nature of the present invention and the principles of design is to be considered as pertinent to all screw sizes and head styles that incorporate a recess drive system and can benefit from the innovation.

Therefore, the size range and head style, for the purpose of description, has been selected as a size range between M3.5 and M5 and the head style as being that of the 'flat head', having a 90 degree countersunk head, as defined in ASME. B18.6.7M-1998. This range covers recess depths that use the same driver, which has, for identification purposes, been termed #2.

It is not intended for a driver of configuration other than that for the present invention could be used to achieve the best effect for use in a recess of the present invention.

Figure 1:
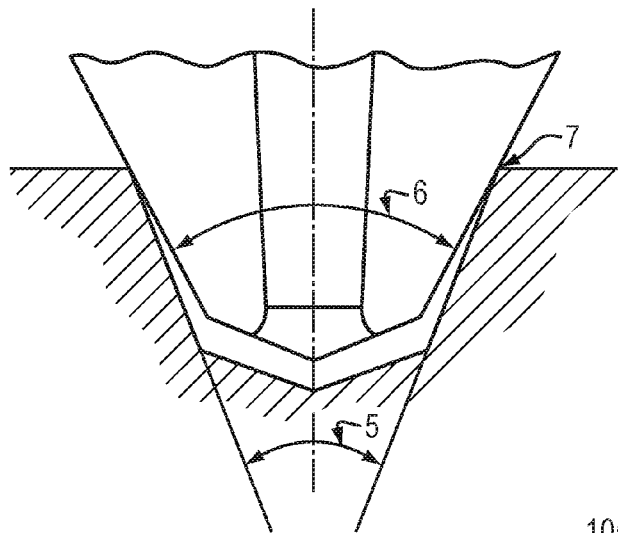
FIG. 1 is a sectional elevation of the prior art conditions that depict the use by which a variation in the driver/recess cone angle allows for the prior art conditions to be met.
Figure 2:
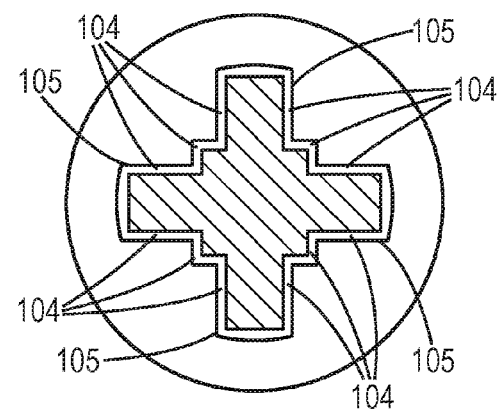
FIG. 2 is a plan view of the prior art conditions that depict the use if the clearances between the radial wings of the recess and driver create conditions of contact, at a point, where the applied torque is transmitted between the top surface of the recess and the edge of the driver wing extremity.
Figure 3:
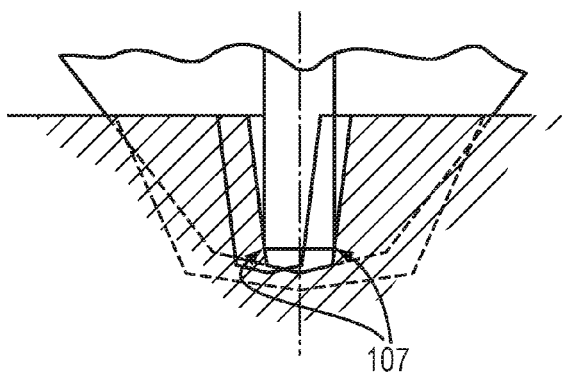
FIG. 3 is a cross section through a recess of prior art that indicates the point at which 'wedging', between the driver and the recess takes place.
Figure 4:
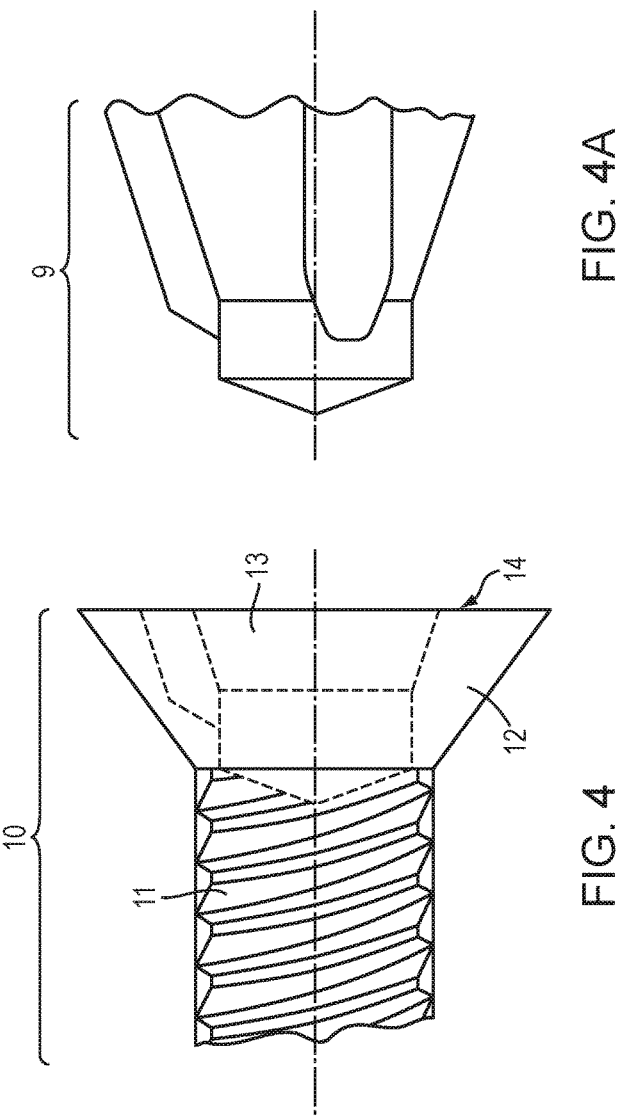
FIG. 4 is an outline drawing of a screw incorporating a recess in accordance with an illustrative embodiment of the present invention.

Referring now to FIG. 4, there is shown a screw 10 having a threaded shank 11. The thread on the shank is illustratively of a helical form around a central core. The form of the thread can be of any known design or may be of a special design that requires rotation, of the screw, to affect an assembly. The head of the screw 12 contains an internal drive recess of the form of an embodiment of the present invention and the recess is so designed as to provide a cavity by which a driver 9 (FIG. 4a) of a form corresponding with that of the recess 13 can provide the rotational movement that enables the screw thread to operate in an expected manner.

The innovative recess will now be described in detail that will show how three radial wings 301 (FIG. 9) will combine with a central cavity 302 (FIG. 8 and FIG. 9) at the top outer surface of the head 14, whose formation is that of a frustum of a cone and will further combine with a central lobular core 303 (FIG. 8 and FIG. 9), to develop the novel and innovative method for a screw recess and driver system. The development of the novel wings will, on their own, create zones of interference 210 (FIG. 5) between driver and recess.

Figure 6:
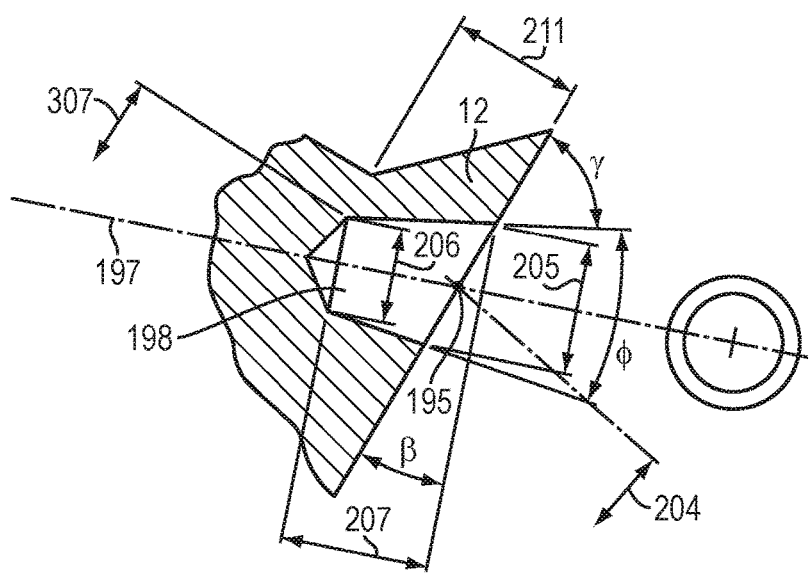
FIG. 6 is a cross section through the recess wings showing the shape construction, in accordance with an illustrative embodiment of the invention.

By reference to FIG. 8 and FIG. 9 it will be determined how the central core of the recess will be used to eliminate this adverse condition and to further enhance the functioning of the combined recess and driver as a tool for the assembly of screws. The frustum of the central cavity 302 has a large diameter 204 that has a magnitude developed from the position where the center of the angled wing cone meets the surface of the screw head 195 (FIG. 6). The angle of the cone a is that which is developed for the cone angle of the recess wings FIG. 6.

The depth of the conical center 305 is calculated and based upon the difference in the height of the largest diameter head that will utilize a #2 recess and driver system and the smallest diameter head that would utilize a #2 recess and driver system. See FIG. 7 (202). In practical terms, the actual height of the cone 305 will be in the order of 1.25× the value calculated for 202. The purpose behind having this increase in 305 over the calculated value for 202 is to ensure that the conical center will appear on all sizes of screw and head style.

Having determined that the inner diameter of the cone 306 at cone height 305 from the formula:

inner cone dia. 306=203−(2(305/tan α))

we are in a position to set the inscribing dimension for the lobular inner core=306.

The circumscribing circle for the lobular core 307 is that which corresponds with the inner cone of the point of the conical wings. (see also 307 as shown in FIG. 6) It is considered of benefit, however, if this circumscribing dimension, for the lobular core be increased by between 10 and 12%. This will improve the torsion driver strength of the lobular core and provide for a more effective distribution of the forces transmitted during the assembly of the screw. The depth of the lobular core 308 at its base apex 309, is controlled so as to be no deeper than where the smallest head diameter, (for an M3.5 screw as selected for the descriptive embodiment), meets the juncture between the head and screw shank. (see, e.g., 311 as shown in FIG. 8.) The angle of the core depth apex 310 is stated as being 120°, but may vary to meet manufacturing conditions.

Figure 10:
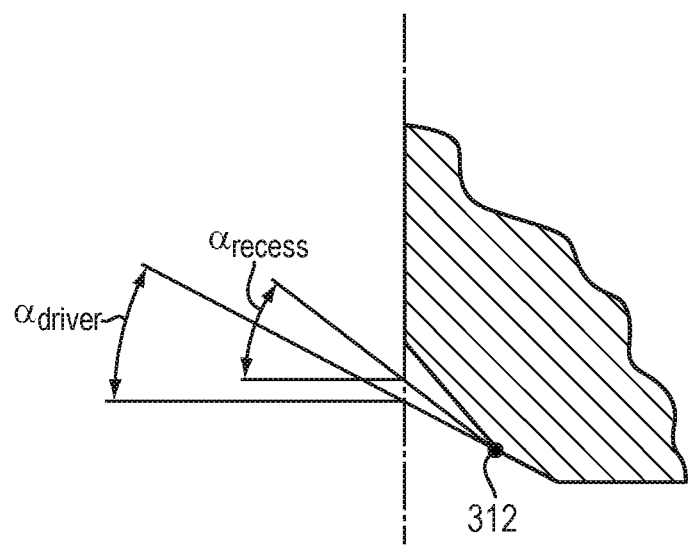
FIG. 10 is a part section, through the head of the screw, showing the position where mechanical adhesion takes place between the recess and the driver.
Figure 11:
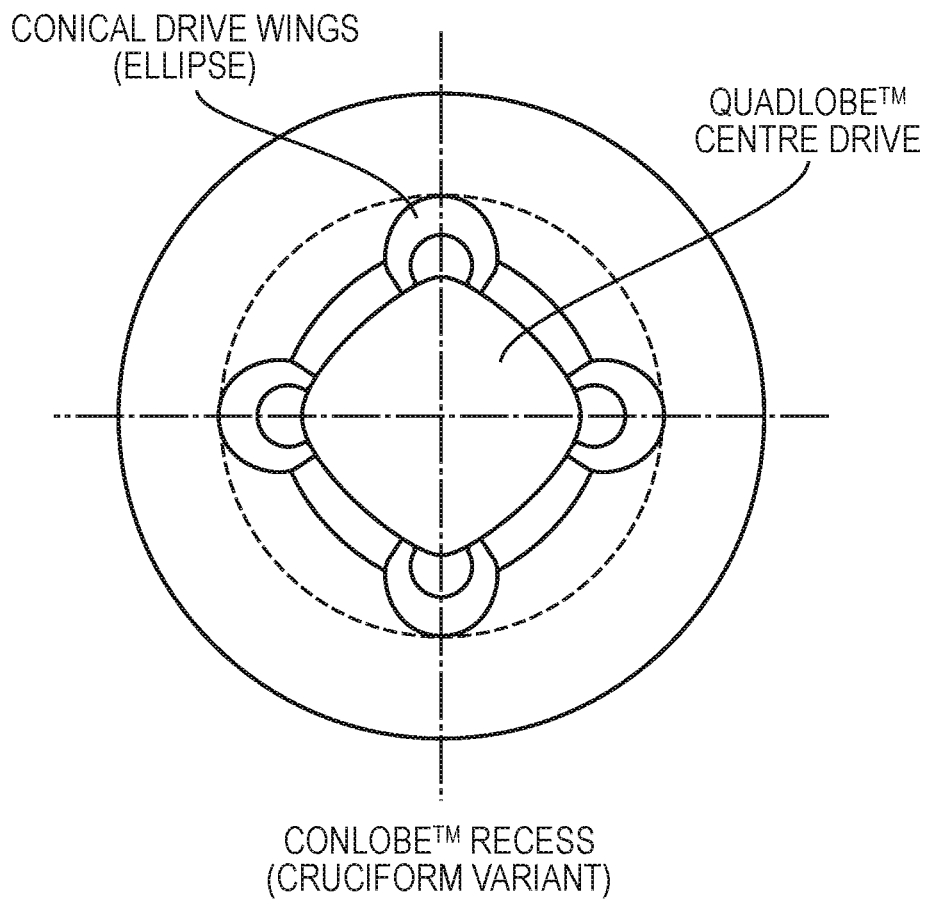
FIG. 11 is a plan view of the head of the screw where the radial extending wings are of a cruciform and the central core is of a lobular, square cross section.

A further illustrative embodiment of the invention is shown with reference to FIG. 10. There are controlled differences between the value of the central cone angle α. The recess angle is controlled within limits of α+0+1° and the driver cone angle=α+0−1°. This will provide a small feature of mechanical adhesion, between the driver and recess at point 312, FIG. 10. Illustratively, this will allow the screw, by way of its recess, to 'cling', to the driver.

It is recognized, by the novel nature of the design, that this restriction may result in a condition that will allow the wing cones, of the driver, to stand off from the wing cones of the recess and create a small clearance between the related elliptical driving planes.

However, due to the adhesion taking place around cones (or frustum of cones), there will be allowed 'sliding' to take place, due to the rotational force being applied to the driver, in a way that will allow the clearances to be taken up and contact to be achieved at the related elliptical wings. Notably, such a feature cannot be achieved by applying the mechanical adhesion at the bottom of the radial wings of the prior art systems.

From the above descriptions, it can be seen that the innovative construction of the screw recess and matching driver will provide the following advances over cruciform or tri-wing systems that are in use.

- a drive system that transmits the rotational forces that is required as a feature of ' screw driving', do so through mating elliptical and lobular formations.
- a system that allows a screw recess and a driver to be engaged with the driver approaching the recess in an axial plane, without the need for setting tight tolerances of wing and recess core features of related recess and driver.
- a driver and recess system that provides for mechanical adhesion, between the recess and the driver, that will not require withdrawal of the driver, from the recess, to allow wing contact to take place at the preferred driving zones.

To enhance the understanding of the novelty in construction of the system and to stress how the innovation can be developed, there follows a mathematical analysis that will determine the physical sizes, of the screw recess and, by inference, the corresponding driver dimensions for the development of a #2 size driver and recess.

For this purpose reference should initially be made to FIG. 7 and FIG. 7a

Stage 1

The initial aim is to establish the magnitude of angle α, which is has been stated as being appropriate for screw head diameters M3.5 to M5, of the 90° flat head style.

Head diameter 200 (FIG. 7) represents that of the M5 screw. (size selected 9.3 mm. diameter).

Head diameter 201 (FIG. 7) represents that of an M3.5 screw. (size selected 7.3 mm. diameter).

This will establish that the 3.5 mm screw will have a head height that is 1.00 mm below that of the 5 mm diameter screw designated 202 FIG. 7 (position of 14a below that of 14 as shown in FIG. 7a)

The circumscribing circle that relates to the outer periphery of the recess wings 203 (FIG. 5) is selected as being 5.60 mm diameter, for an M5 screw.

The circumscribing circle that relates to the outer periphery of the recess wings, for an M3.5 diameter screw is selected as being 4.58 mm diameter.

The selection of these circumscribing circle diameters does not restrict the innovation to these numbers. They are chosen for the purpose of being descriptive of the relationships formed by each of the elements of the innovation.

Thus, the tangent of the angle α is developed from, tan α=(5.6−4.58)/2=0.509=27° and the included cone angle of the driver and the recess wings are 54°.

Stage 2

This next stage is to develop the shape and construction of the recess wings. The selection of the wing width, for an M5 screw is that of having a magnitude of 1.65 mm. As noted above, the selection is, again, for demonstration purposes and should not be considered restrictive to the present innovation. The shape of the radial wings are developed from a cone.

The cone has a base diameter that is equal to the width that has been chosen for recess width. 1.65 mm. (205 FIG. 6). This figure should also be considered as non restrictive to the innovation.

The cone angle is selected as being 8° inclusive, (Φ, FIG. 6), for demonstration purposes, but can lie within the range 4° to 8° with the proviso that the matching angle, on the driver, is maintained at the same selected value.

The angle β directly relates to the angle where the perpendicular to the angle is that which controls the direction that the wings are pressed into the screw head, relative to the axis of the screw.

Thus,

β=α−(Φ/2)=23° (for a cone angle of 8° and 25° for a cone angle of 4°)

For practical purposes, the height at which the smaller diameter of the frustum of the cone should penetrate the head 211 (FIG. 6), should be no greater than the head height of the M5 diameter screw. (2.70 mm.).

and,

Penetration depth 207 (FIG. 6) = (211/cosα)(cos(Φ/2))
= (2.70/0.8910)(0.9976)
= 3.02 mm The small diameter, of the frustum of the cone 206 (FIG. 6) is calculated as;

$$206 = 205 - (2 \times (207 \times (\tan(\Phi/2)))$$
$$= 1.65 - (2 \times (3.02(0.0699)))$$
$$= 1.23$$

These calculations set the shape of the radial outer wings of the recess.

It will be seen that the top surfaces, of this section of the innovation will appear as being elliptical. It is the matching elliptical driving faces, between, driver and recess, that provide for advantageous transmission of torque.

Stage 3

Figure 5:
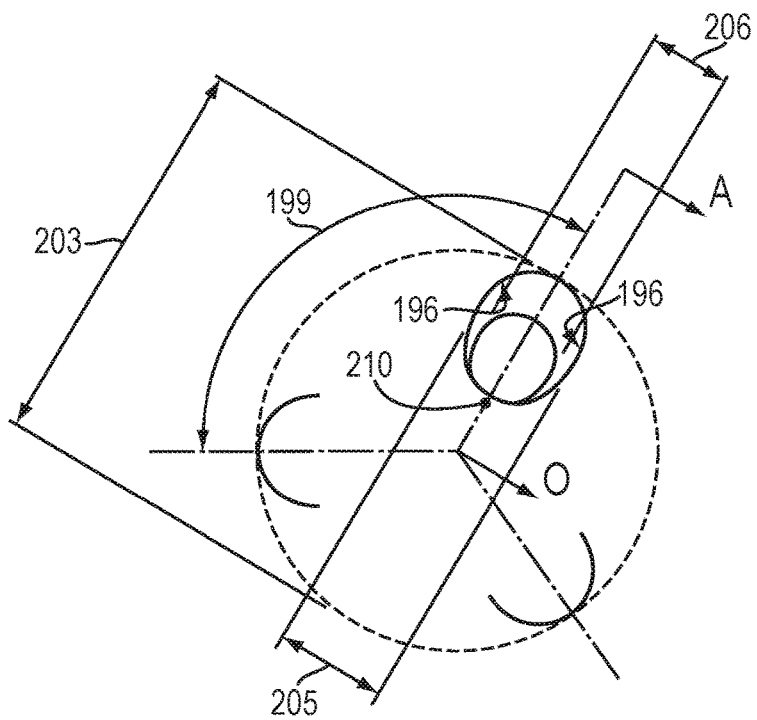
FIG. 5 is a drawing, shown in plan, depicting the screw head and recess, in accordance with an illustrative embodiment of the invention.

In this development we will consider the frustum of the cone that makes up the zone at the top of the recess. This development does a number of things to enhance the recess.

a) It removes the interference area that is shown as 210 in FIG. 5.

b) It creates a position, within the recess, that can be used to check the recess depth; and c) It allows a mechanical adhesion position, between the recess and the driver.

The dimension for the diameter of the cone, at the top surface of the head, is developed from:

diameter 204 (FIG. 8)=203-205 (FIGS. 5 & 6)

204=5.6-1.65=3.95 mm.

The depth of the frustum 305=
1.25× the height difference 202 (FIG. 7)
=1.25×1.00=1.25 mm Illustratively, this height may vary between 1.25 and 1.50. Whatever is selected will require adjustment to be made to the inscribing circle of the lobular center.

For demonstration purposes, the angle of the cone a will remain at the selected value of 27°. The lower diameter 306 (FIG. 8) of the frustum of the cone will be calculated as:

$$Dia.\ 306 = dia.\ 204 - (2 \times (305\ \tan\alpha))$$
$$= 3.95 - (2 \times (1.25 \times 0.5095))$$
$$= 3.95 - 1.274$$
$$= 2.68\ mm.$$

This calculated value becomes the inscribing circle 306 of the lobular inner core of the recess.

The circumscribing circle 307 (FIG. 9) of the lobular core, is a selected value that is seen to appropriate for the purpose of preventing slippage between driver and recess when torque is applied.

For the purpose of demonstration the value of the circumscribing circle 307 is selected as being:
3.137 mm Thus, the lobular shape, of the inner core, will illustratively be that of a TRILOBULAR® configuration and will have the following proportions:
307 circumscribing circle=3.137 mm
306 inscribing circle=2.68

The depth, of this lobular inner core, from the surface of the head, (M5 size product) will be that which enables the strength, of the fastener, in torsion, to be maintained as appropriate for driving the screw. For this demonstration, a value for recess depth 308 (FIG. 8) is considered to be head height 208+25%. This equates to 3.38 mm for a 5 mm screw.

The calculations that have been undertaken under STAGE 1, 2 and 3 in the foregoing Specification, are considering of the inventive nature of the system.

In consideration of manufacturing tolerance requirements, there is a need to modify some of the numbers in order to set a requirement of need. Whilst it is appropriate to use the novelty of matching cones, to enable driver recess engagement, those skilled in the art will recognize that to leave some dimensions without adequate control, will give the manufacturer, of the system, too much latitude in the selection of appropriate dimensioning.

In consideration of some manufacturing control, there is set out considered tolerance bands that can be accepted without detriment to the present invention.

Manufacturing Considerations

To those who are skilled in the art, it will be obvious that having dimensional control in a manner that will result in both the driver and the recess having identical size and configuration, will, without question, provide for the best possible use of the present invention. It will also be clear that the present invention, with the novel use of shapes that are based upon modifications to cones will allow for consistencies to be achieved in the mating of driver and recess shapes, that are not achieved with the straight sided radial wings of known cruciform and tri-wing systems and that the changes made to exterior cone angles of POZIDRIV®, SUPADRIV® or PHILLIPS® recesses or drivers will not meet the same degree of effectiveness as the method and approach that has been taken to the present invention.

However, it has to be recognized that, even with the advances that have been made in the accuracy and control of dimensions, since recesses were introduced in the 1930's, it is imperative for allowances to be made in order to achieve function, ability and quality control that are related to mass production industries.

Consideration 1 is related to the frustum of a cone that is the initial basis for the radial wings of the present invention. The aim, relating to the mating of driver and recess would be to have the maximum possible depth engagement to be achieved. To achieve such a condition, when manufacturing tolerances are taken into consideration, will require the driver configuration to be smaller than that of the recess.

It is further recognized that to transmit torque, in the most effective way, and in consideration of dimensional tolerance to be applied, the aimed contact should be close to the top, outer position of the recess.

Thus, to avoid initial contact to occur at the inner depth position of driver and recess, it would be allowable for the wing cone angle to be of a greater magnitude that its respective counterpart within the recess.

Consider the recess wing cone angle to be:
8°+0/−1° included and
the driver wing cone angle to be:
8°−0/+1° included Consideration 2 relates to the tolerance given to the cone dimension from which the wing frustum and the subsequent elliptical shape of the wing is developed.

Benefits are achieved if we can again induce the driver to penetrate into the recess to its maximum depth. This is achieved by having the cone base dimension, of the driver, smaller than the theoretical cone base dimension, of the recess.

Consider, the theoretical cone base dimension, of the recess to be:
1.65 mm−0+0.04 mm
the theoretical cone base dimension, for the driver to be:
1.65 mm−0.04+0 mm.

Consideration 3 relates to the central cone frustum and the relative requirements of this cone in consideration of dimensions and function of the interface between driver and recess.

The function is to provide a degree of stability, between driver and recess, but further to achieve mechanical adhesion between the driver and the recess. (This adhesion is only for providing a feature that will stop the screw falling off the driver whilst it is being presented to the assembly position. Once the screw is in position and driving takes place, this feature is no longer required. The diameter, at the top outer position of the recess has been calculated as 3.95 mm dia. and at the lower diameter. as 2.68 mm. The included angle of the frustum of the cone being 54°.

The aim is for this angle to increase by no more than 1°, Thus, the recess center cone angle would be contained within;

54°+1°−0 and the driver cone angle, at this datum, will be contained within;

54°+0−1°

This will aim the contact (adhesion) zone of the recess and driver, toward the inner zone of the cone (Frustum).

This inner contact position, on the taper, will give the adhesion that is being looked for, but will also maintain stability between driver and recess such that no more the 2° of driver recess axes out of line would occur.

The aim dimension of the inner cone frustum would remain at 2.68 mm, but the actual inscribing circle diameter, of the lobular core, would be within limits.

Thus, inscribing circle=2.68+0.02/−0

Thus, the inscribing circle, of the driver, at the intersection with the driver cone will be:

2.86 mm−0.02/−0.04

This will create a small amount of clearance between the lobular inner core, of the recess and the corresponding driver point. The aim for adhesion, in this area of the driver/recess combination, will, in effect, stop the wings from achieving full engagement of the driver and recess. They will be stopped by the wedging action at the center core.

However, once torque is applied to the driver and when the recess needs such torque to perform the driving function, of the screw, the central cones, of recess and driver, will 'slip' relative to each other, and the clearances that are potentially developed at the elliptical driving faces, will be taken up. Illustratively, the only restriction between the 'slipping' of the driver and the recess, is when the wing clearances and/or the lobular core clearance has been taken up.

The foregoing description has been directed to specific embodiments. It will be apparent; however, that other variations and modifications may be made to the described embodiments, with the attainment of some or all of their advantages. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A fastener comprising:
   a head;
   a recess having a central cavity, in the head, that further comprises three radial extending-grooves that terminate within the head of the fastener;
   the central cavity comprising a lobular inner zone having three lobes having their maximum, circumscribing circle, positioned in line with the imaginary center of the radial extending grooves;
   wherein the radial extended grooves are developed from a frustum of a cone whose center line is angled away from that which is parallel to the axis of the fastener and provides an inwardly tapering, outer cone angle, of the recess that has the effect of providing elliptical and inwardly tapering elliptical sections as the radial extending grooves progress into the head of the fastener; and
   an additional central portion of the cavity being constructed as a frustum of a cone that culminates at the inscribing circle of the lobular inner zone.

2. The fastener in accordance with claim 1, wherein the outer cone angle of the radial extending grooves are at an angle of 27° to the axis of the fastener.

3. The fastener in accordance with claim 1, wherein the outer cone angle of the radial extending grooves are at an angle of between 25° and 27° to the axis of the fastener.

4. The fastener in accordance with claim 1, wherein the frustum of the cone used to develop the radial extending grooves of the recess has an included cone angle of 8°.

5. The fastener in accordance with claim 1, wherein the frustum of the cone used to develop the radial extending grooves of the recess has an included angle that lies within the range 4° to 8°.

6. The fastener in accordance with claim 1, wherein the centerline of the frustum of the cone, used to develop the radial extending grooves is such as to provide the radial outermost side of the cavity to match the recess outer cone angle for claim 2 or claim 3.

7. The fastener in accordance with claim 1, wherein the frustum of the cone, at the central cavity adjacent to the top surface of the head, has a magnitude that equates to a circumscribing circle of the outermost position of the radial extending grooves, less the maximum width of the elliptical top edge of the radial extending grooves.

8. The fastener in accordance with claim 1, wherein the included angle of the frustum of the cone is 54° and tapers inwardly from the maximum diameter at the surface of the head.

9. The fastener in accordance with claim 8, wherein the cone angle, of the frustum of the cone, lies within the range 54° to 55°.

10. A fastener in accordance with claim 1, wherein the depth of the central cavity, as developed from the frustum of the cone, terminates at the inscribing circle diameter of the lobular, central cavity.

11. A fastener of the kind specified that is characterized by a recess having a central cavity in a head that further comprises four radial extending grooves that terminate within the head of the fastener, wherein the central cavity comprises a lobular inner zone having four lobes with their maximum circumscribing circle positioned in line with the imaginary center of the radial extended grooves and where the radial extending grooves are developed from a frustum of a cone whose center line is angled away from that which is parallel to the axis of the fastener and provides an inwardly tapering outer cone angle of the recess that has the effect of providing elliptical and inwardly tapering elliptical sections as the radial extending grooves progress in to the head of the fastener; and
   wherein an additional central portion of the cavity being constructed as a frustum of a cone that culminates at the inscribing circle of the lobular inner zone.

12. A fastener of the kind specified that is characterized by a recess having a central cavity in the head and that further comprises two diametrically opposed radial grooves that terminate within the head of the fastener, wherein the central cavity comprises an oval inner zone having its maximum circumscribing diameter positioned in line with the imaginary center line of the diametrically opposed radial grooves and where the diametrically opposed radial grooves are developed from a frustum of a cone whose center line is angled away from that which is parallel to the axis of the fastener and provides an inwardly tapering outer cone angle of the recess that has the effect of providing elliptical and inwardly tapering elliptical sections as the radial grooves progress in to the head of the fastener; and wherein an additional central portion of the cavity being constructed as a frustum of a cone that culminates at the inscribing circle of the oval inner zone.

\* \* \* \* \*